(12) United States Patent
Etzbach et al.

(10) Patent No.: US 11,472,450 B2
(45) Date of Patent: Oct. 18, 2022

(54) METHOD AND CONTROL UNIT FOR DETECTION OF DERAILMENT ON THE BASIS OF WHEEL SPEED SIGNALS

(71) Applicant: KNORR-BREMSE SYSTEME FÜR SCHIENENFAHRZEUGE GMBH, Munich (DE)

(72) Inventors: Andrea Etzbach, Munich (DE); Ulf Friesen, Neubiberg (DE); Norman Kreisel, Munich (DE)

(73) Assignee: KNORR-BREMSE SYSTEME FÜR SCHIENENFAHRZEUGE GMBH

( * ) Notice: Subject to any disclaimer, the term of this patent is extended or adjusted under 35 U.S.C. 154(b) by 514 days.

(21) Appl. No.: 16/472,465

(22) PCT Filed: Dec. 12, 2017

(86) PCT No.: PCT/EP2017/082386
§ 371 (c)(1),
(2) Date: Jun. 21, 2019

(87) PCT Pub. No.: WO2018/114474
PCT Pub. Date: Jun. 28, 2018

(65) Prior Publication Data
US 2021/0129879 A1    May 6, 2021

(30) Foreign Application Priority Data
Dec. 21, 2016  (DE) ............ 10 2016 125 196.8

(51) Int. Cl.
*B61L 25/02*  (2006.01)
*B61L 15/00*  (2006.01)
(Continued)

(52) U.S. Cl.
CPC ....... *B61L 15/0081* (2013.01); *B61L 15/0018* (2013.01); *B61L 25/021* (2013.01);
(Continued)

(58) Field of Classification Search
CPC ............. B61L 15/0018; B61L 15/0081; B61L 25/021; B61L 27/04; B61L 2201/00; G01P 3/00; B61F 9/005; B61K 9/12
See application file for complete search history.

(56) References Cited

U.S. PATENT DOCUMENTS

2015/0193992 A1* 7/2015 Kumar ............... B61K 9/12
701/29.2
2017/0282942 A1* 10/2017 Mathews, Jr. ........ B61L 3/008

FOREIGN PATENT DOCUMENTS

AU    2018200075 A1    1/2018
CN    103781682 A      5/2014
(Continued)

OTHER PUBLICATIONS

International Search Report and Written Opinion for corresponding application PCT/EP/2017/082386 dated Jul. 7, 2018.

*Primary Examiner* — Zachary L Kuhfuss
(74) *Attorney, Agent, or Firm* — Barnes & Thornburg LLP

(57) ABSTRACT

The invention relates to a method for determining a critical driving situation of at least one wheel of a rail vehicle, wherein a characteristic value of a fluctuation strength of a raw speed signal of at least one wheel is determined, and wherein, for the purpose of evaluating the driving situation, said characteristic value is compared with criteria which describe a critical driving situation. Upon detection of a critical driving situation, the method provides that an action is triggered in the rail vehicle, wherein the method is designed in such a way that it can be combined with or make use of a sensor system and processing devices as found in a modern rail vehicle.

23 Claims, 2 Drawing Sheets

(51) Int. Cl.
*B61L 27/04* (2006.01)
*G01P 3/00* (2006.01)
(52) U.S. Cl.
CPC ........... *B61L 27/04* (2013.01); *B61L 2201/00* (2013.01); *G01P 3/00* (2013.01)

(56) References Cited

FOREIGN PATENT DOCUMENTS

| | | | | |
|---|---|---|---|---|
| DE | 19835041 | C1 | 8/1999 | |
| DE | 602004008735 | T2 | 6/2008 | |
| DE | 102011001978 | A1 | 10/2012 | |
| DE | 102013015397 | A1 | 11/2014 | |
| DE | 102014108685 | A1 | 12/2015 | |
| EP | 1236633 | A2 | 9/2002 | |
| EP | 1559625 | A1 | 8/2005 | |
| EP | 1600351 | A1 * | 11/2005 | ................ B61L 1/20 |
| WO | 0194174 | A1 | 12/2001 | |
| WO | 2012140073 | A1 | 10/2012 | |
| WO | WO-2015193333 | A1 * | 12/2015 | .............. B61L 23/00 |

\* cited by examiner

METHOD AND CONTROL UNIT FOR DETECTION OF DERAILMENT ON THE BASIS OF WHEEL SPEED SIGNALS

CROSS REFERENCE AND PRIORITY CLAIM

This patent application is a U.S. National Phase of International Patent Application No. PCT/EP2017/082386 filed Dec. 12, 2017, which claims priority to Germen Patent Application No. German 10 2016 125 196.8 filed Dec. 21, 2016, the disclosures of which are incorporated herein by reference in their entirety.

FIELD

Disclosed embodiments relate to a method for the detection of a derailment state of one or more wheels of a rail vehicle on the basis of wheel speed signals.

BACKGROUND

In the travel mode of rail vehicles, in particular of long trains, it is possible for individual wheels, wheel sets or entire bogeys to derail without being noticed by the vehicle driver. As a result, the derailed wheel, the wheel set, the bogey or the entire wagon is dragged along by the rail vehicle, wherein, for example, the wheel impacts repeatedly on the railroad line superstructure. This can give rise to considerable damage to the track superstructure, to the rail vehicle or to both.

A further high risk of an accident consists in the fact that the detailed railed vehicle is no longer oriented in the customary direction of travel but rather its projection protrudes beyond the customary vehicle width traversely to respect to the direction of travel. This can give rise to serious accidents with considerable material damage, extending as far as injury to persons if the rail vehicle hits an obstacle such as the surround of a tunnel or a pier of a bridge.

For this reason it is appropriate to detect derailment of individual wheels, wheelsets, bogeys or entire wagons in good time and initiate corresponding countermeasures. The countermeasures can be initiated here automatically or by the vehicle driver. For example, immediate braking of the derailed rail vehicle to a stationary state constitutes a countermeasure.

Furthermore, a method which reliably detects a critical travel situation even before derailment actually occurs and initiates corresponding countermeasures is advantageous.

Detection of derailment will be required in future by various guidelines and standards, e.g., DIN EN 62267 a system for detecting derailment in the driverless mode is required.

Against this background, a series of such systems are described in industrial use, or such systems are described in patents.

WO 2012140073 A1 describes a method for detecting derailment using the difference between a wheel speed signal and an expected rotational speed. So that the travel state can always be detected reliably, a wear factor of the wheels is included in the calculation, since the wear of the wheel changes the ratio of the wheel speed to the velocity.

WO 2001094174 A1 describes a method for the detection of derailment using a comparison of the wheel speeds with one another or a comparison of the wheel speeds for with a mean value of a plurality of wheel speeds.

Both devices use the deviation of at least one rotational speed signal from a setpoint value for the detection of derailment. It is disadvantageous here, in particular, that as a result of rotational speed fluctuations which occur the limiting values can be incorrectly exceeded and therefore evaluation measures which are comparatively costly have to be taken in order to detect derailment reliably.

EP 1236633 A2 describes a method for the detection of derailment by evaluation of a wide variety of characteristic values, inter alia the evaluation of profiles of the angular speed or angular acceleration of the wheel.

SUMMARY

Disclosed embodiments differentiate the time profile of the rotational frequency of the wheels twice over time, and as a result a changing acceleration behavior of the wheel or of the wheel set shaft, such as is characteristic of derailment, is detected. This changing acceleration behavior of the wheel or of the wheelset shaft may be again caused by the irregular impacting of the derailed wheel on the ground.

Disclosed embodiments use sensor systems and processing devices which are present in the vehicle in any case or are easy to retrofit, and which method can be implemented easily on an existing control unit.

BRIEF DESCRIPTION OF FIGURES

In the text which follows, the description of the invention will be given using exemplary embodiments and with reference to the appended drawings, in which, in particular.

DETAILED DESCRIPTION

Figure 1:
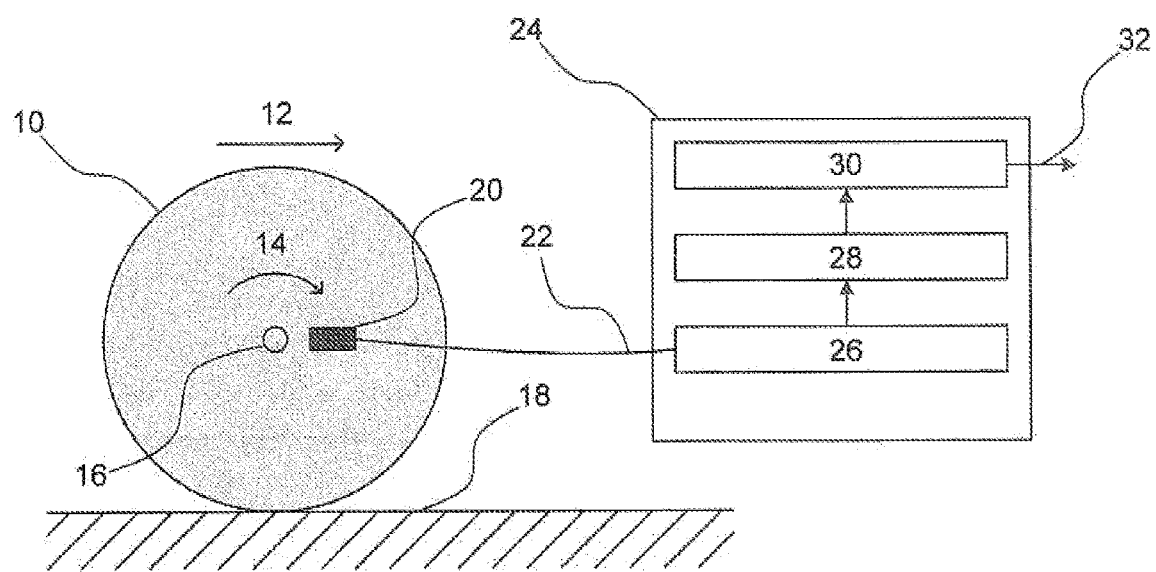
FIG. 1 shows a basic design of the means for detecting derailment at a single wheel and the further processing of the signals in an evaluation unit.

In order to detect the derailment, it is proposed that the time profile of the rotational frequency of the wheels be differentiated twice over time, and as a result a changing acceleration behavior of the wheel or of the wheel set shaft, such as is characteristic of derailment, is detected. This changing acceleration behavior of the wheel or of the wheelset shaft is again caused by the irregular impacting of the derailed wheel on the ground.

However, the processing of the derivative of a time signal always requires a large amount of expenditure since even braking operations, which occur with a chronologically variable deceleration, are different from zero in the second derivation of the rotational frequency of the wheel and are therefore visible.

In a further embodiment of this invention, the coordination of the wheel speeds with one another, similarly to WO 2001094174 A1, is described.

In order to carry out the method, in addition to the determination of the rotational frequency, for example, acceleration signals are also needed, which makes additional requirements on the sensor system which is installed in the rail vehicle.

The object of the present invention is to make available a method which solves the abovementioned problems and is additionally distinguished by the use of sensor systems and processing devices which are present in the vehicle in any case or are easy to retrofit, and which method can be implemented easily on an existing control unit.

The method may make use of a rotational speed signal of at least one rotational speed-sensing device which may be installed in the rail vehicle in order to determine a wheel speed, in order to obtain knowledge about the current travel state (e.g., the wheel speed or the velocity).

This rotational speed-sensing device may be embodied as a rotational speed sensor which generates pulse generator signals from the wheel speed.

Embodiments with sensor arrangements and sensor combinations are conceivable which permit the wheel speed of individual wheels, wheel sets or entire bogeys to be measured.

The rotational speed raw signal of the rotational speed sensor can be present here in an analog or digital form. The rotational speed raw signal of the sensor can be present here as a pull wheel frequency, angular speed or in some other suitable form.

The rotational speed raw signal is transferred to an evaluation device for further processing. The evaluation device may contain sections for conditioning signals, determining characteristic values and evaluating travel states.

The rotational speed raw signal may be firstly transferred to a signal conditioning section in which the conditioning of the signal for further processing takes place. In this context, signal conditioning methods and methods for preliminary analysis of the rotational speed raw signal, such as antialiasing filtering, digitization of an analog signal, changing or adapting the sampling, offset adjustment, physical conversion, Fourier transformation, envelope curve formation, extreme value determination, plausibility checking etc. can be applied to the rotational speed raw signal.

One advantageous embodiment of an envelope curve formation constitutes, for example, the formation of a hose-shaped envelope curve around the rotational speed raw signal, in order, inter alia, to describe in a simplified fashion the time profile of the rotational speed raw signal for the subsequent processing. In this context, the envelope curve can be determined essentially by maximum values and minimum values of the rotational speed raw signal or else also approximately follow the profile of the rotational speed raw signal.

During the plausibility checking of the rotational signal raw signal, suitable algorithm are essentially used to check whether the received rotational speed raw signal is at all plausible, i.e. is physically correct, or whether it matches the current travel state. Optionally, e.g., a rotational speed raw signal of $-10,000$ min$^{-1}$ at one wheel will be evaluated as impossible when there are rotational speed values of $+2000$ min$^{-1}$ at the other wheels and will not be used for further consideration.

In an exemplary method, the signal conditioning section may be followed by a characteristic value determining section in which a characteristic value relating to the current state of the rail vehicle is determined from the rotational speed signal which may be conditioned by the signal conditioning section.

This characteristic value may describe the fluctuation intensity of the rotational speed signal, of a wheel, of a wheel set or of an entire bogey.

The basic concept for the determination of the characteristic value is here that the rotational speed of a wheel which rolls on a rail is accelerated or decelerated, and it is always subject to certain fluctuations in the rotational speed, irrespective of whether the wheel moves at a constant velocity. These fluctuations can be brought about inter alia by fabrication tolerances, wear, frictional engagement in the wheel-rail contact or fluctuations in the drive unit of the vehicle.

However, these fluctuations are expressed in a significantly smaller form in terms of their fluctuation intensity and the rotational speed fluctuations in the case of a derailed wheel which is repeatedly accelerated or decelerated as a result of irregular contact with the ground.

In the text which follows, exemplary embodiments for the determining of a characteristic value which represents a measure of the fluctuation intensity of the wheel speed are described. The advantage during the determination of the fluctuation intensity is that it is not necessary to determine a precise rotational speed but merely a statement has to be made as to how intensively the rotational speed fluctuates.

The determination of the fluctuation intensity of the rotational speed signal may be carried out with a suitable analysis method such as, e.g., the determination of the variance of the rotational speed signal over a sliding time window. Optionally, the fluctuation intensity of the rotational speed signal may be determined as a standard deviation of the rotational speed signal over a sliding time window. Optionally, the fluctuation intensity of the rotational speed signal may be determined as a quadratic mean value of the rotational speed signal over a sliding time window. Optionally, the fluctuation intensity of the rotational speed signal may be determined as an arithmetic mean value of the rotational speed signal over a sliding time window. Optionally, the fluctuation intensity of the rotational speed signal may be determined as a range of the rotational speed signal, that is to say essentially the difference between suitable maximum and minimum values, over a sliding time window. Optionally, the fluctuation intensity of the rotational speed signal may be described as the change in the frequency components of the rotational speed signal, over a sliding time window. These frequency components can be determined by Fourier analysis over the sliding time window. Optionally, the fluctuation intensity of the rotational speed signal may be determined as a quantile of the rotational speed signal over a sliding time window. Optionally, the fluctuation intensity of the rotational speed signal may be determined as a median of the rotational speed signal over a sliding time window. Optionally, the fluctuation intensity of the rotational speed signal may be determined as a variation coefficient of the rotational speed signal over a sliding time window. Optionally, the fluctuation intensity of the rotational speed signal may be determined as a mean absolute interval of the rotational speed signal over a sliding time window. Optionally, the fluctuation intensity of the rotational speed signal may be determined as an interquartile interval of the rotational speed signal over a sliding time window.

As described above, the advantage of this embodiment consists in the fact that it is not necessary to determine a precise rotational speed but merely a statement has to be made as to how intensively the rotational speed fluctuates.

The sliding window itself, which defines the consideration time period of analysis time period of the rotational speed signal, may be defined in such a way that a reliable differentiation can be made between the states of "not derailed" and "derailed". The range of the sliding time window can extend here from small values below 0.1 s as far as large values of several seconds, or even above. When the sliding time window is defined, the sampling weight of the signal may also be taken into account. In general, the object of the developer is to define a suitable time window.

In accordance with at least one embodiment, the sliding time window may be configured in a variable fashion. The width of the analyzed time window may be determined by the velocity of the rail vehicle and may decrease as the velocity increases.

In accordance with at least one embodiment, weighting factors are applied to the fluctuations within the sliding time window, so that relatively old fluctuation values may be given smaller weighting than relatively new ones.

The characteristic value which is determined in the characteristic value determining section is then optionally transmitted to an alarm generating section which may be able to make the decision between the states such as, e.g., "non-critical" and "critical" on the basis of the currently valid characteristic value. A non-critical state is given, e.g., by the rolling wheel on the rail (referred to as "not derailed"), and a critical state can be, e.g., a derailed wheel.

Moreover, the outputting of further states is possible in order to permit more detailed evaluation of the current travel state. It is, therefore, possible to output intermediate states, such as a pre-critical state, in order to alert the driver to this situation.

In the derailed state, this alarm generating section may output a signal which informs the vehicle driver about the critical state. This signal may be of an optical or acoustic nature.

In accordance with at least one embodiment, the alarm generating section or the output signal thereof may trigger an action when a wheel is derailed. This action can be emergency braking up to the stationary state of the rail vehicle.

The determination of the "not derailed" or "derailed" state is optionally carried out in the alarm generating section by a comparison of the characteristic value, determined in the characteristic value determining section, of the fluctuation intensity of the wheel speed with a limiting value.

The limiting value for a specific fluctuation intensity starting from which a derailed state may be inferred may be defined in advance in such a way that reliable detection of derailing is ensured.

In accordance with at least one embodiment, the limiting value for a fluctuation intensity of the wheel speed starting from which a critical state may be inferred and may be defined as a function of the velocity. The limiting value can then be predefined essentially as a characteristic curve of the fluctuation intensity of the wheel speed plotted against the velocity of the vehicle, so that velocity-dependent fluctuation intensities of the wheel speed can also be taken into account.

In accordance with at least one embodiment, the limiting value for a fluctuation intensity of the wheel speed starting from which a critical state that must be inferred may be defined by continuous or phase-wise on-line learning during travel in the entire railroad line network in the evaluation unit. It is, therefore, possible to essentially determine a limiting value which takes into account the conditions of the railroad line network and continuously adapts itself thereto. As a result, essentially a reduction in the application expenditure is conceivable, since, e.g., data records which are suitable for every country do not have to be kept available and maintained for every country.

In accordance with at least one embodiment, a derailed state may be inferred only if the limiting value of the fluctuation intensity is exceeded for a specific time period. Therefore, certain debouncing of the evaluation is ensured, as a result of which the erroneous determination of a derailment state owing to brief exceeding of a limiting value, e.g., as a result of a deformed rail, is avoided.

In accordance with at least one embodiment, coordination with the fluctuation intensities of the wheel speeds of the other wheels is carried out. As a result, a fluctuation intensity which corresponds to a not derailed state on the current section of railroad line can be inferred by forming mean values of all the fluctuation intensities.

In accordance with at least one embodiment, coordination is carried out of the current fluctuation intensity of the rotational speed signal of one wheel with respect to the fluctuation intensities of the same wheel at earlier time points which may be buffered in the evaluation unit. A derailment process may be detected by virtue of the fact that the fluctuation intensity increases over time in the case of a derailed wheel. This can be done essentially by considering the absolute increase in the fluctuation intensity, or by determining the gradient of the fluctuation intensity. In this context, the change in the fluctuation intensity over time may be defined as a gradient.

A gradient which is determined in this way can be essentially evaluated again with the methods described above.

In accordance with at least one embodiment, at least two evaluation methods as described above are combined. A suitable evaluation logic may be provided which differentiates whether coordination is carried out with respect to a limiting value, or coordination is carried out with respect to a current mean value of the fluctuation intensities may be all the wheel speeds, or coordination may be carried out with respect to fluctuation intensities of wheel speeds of relatively early time points of the same wheel in order to arrive at a decision about the "not derailed" or "derailed" state.

In accordance with at least one embodiment, the determination of the "not derailed" or "derailed" state is carried out by a combination of at least two of these evaluation criteria.

Further embodiments can be obtained by combining at least two of the embodiments described above.

Disclosed embodiments can be combined in any embodiment with other methods or devices for the detection of derailment or for analyzing and evaluating the travel state and may have corresponding interfaces in order to be able to exchange signals or data with other methods or devices. Other methods or devices which are based on measuring and evaluating further physical variables or use them can be here methods for determining tie spacing frequencies, the cross correlation of accelerations or the coordination of wheel speed signals with respect to a reference rotational speed which has been determined, for example, from a GPS-based velocity.

Disclosed embodiments may be integrated into an assembly for the detection of derailment or the analysis of the travel state in which the feedback from all the subsystems is processed.

Disclosed embodiments may be in the form of a computer program product which processes the method described above and which may be stored on a machine-readable carrier. The computer program product may be transmitted to suitable already present control devices of the rail vehicle. This makes it possible to also retrofit existing rail vehicles.

Disclosed embodiments may be in the form of a control device which utilizes a computer program product which executes the method described above and which may be stored on a machine-readable carrier. Such a control device provides the advantage that it can be retrofitted independently of already existing devices.

Disclosed embodiments may provide a control device that has suitable interfaces for triggering an action in the rail vehicle. These interfaces can be present, e.g., in the form of warning lights which can be actuated in the driver's cab or actuator devices in the brake system which can be actuated.

FIG. 1 shows an embodiment of a design of a means for detecting derailment at an individual wheel 10. The wheel 10 is rotatably mounted on a shaft 16 which is connected to the rail vehicle (not illustrated) and the wheel 10 moves to the right in the travel direction 12. The wheel 10 carries out a rotational movement 14 about the shaft 16 here. The wheel 10 rolls on the underlying surface 18 during travel. The underlying surface 18 can be here the rail or, if the wheel 10 is derailed, the superstructure of the track bed, or the like.

A rotational speed-sensing device 20 is attached to the rail vehicle in such a way that it can sense the rotational speed of the wheel 10.

The rotational speed raw signal 22 at the output of the rotational speed-sensing device 20 is transferred to an evaluation unit 24. A plurality of sections (26, 28, 30) are arranged in series in the evaluation unit 24. At first, the rotational speed raw signal 22 is transferred to a signal conditioning section 26 which configures the raw rotational speed signal 22 by suitable conditioning operations (e.g., anti-aliasing filtering, digitalization, scanning, offset adjustment, etc.) such that it can be used for further analysis. The signal which is conditioned in this way is transferred to a characteristic value determining section 28.

The fluctuation intensity of the rotational speed signal is determined as a characteristic value of the current travel state in the characteristic value determining section 28 by suitable evaluation operations (e.g., calculation of the variance, standard deviation, quantile, quadratic mean, arithmetic mean, range, frequency components, etc.). The result is transferred to an alarm generating section 30.

The coordination of the fluctuation intensity, which has been determined in the characteristic value determining section 28, with the limiting values which, have been previously defined by the developer, takes place in the alarm generating section 30. In addition, the determined fluctuation intensity is compared with the fluctuation intensities of other wheels which have been determined in the same way, or with a mean value of the fluctuation intensities. In addition, coordination of the fluctuation intensity of a wheel can be carried out over time so that derailment would result in an increase in the fluctuation intensity in comparison with previously determined fluctuation intensities.

The alarm generating section 30 is configured in such a way that it can infer one of the states "not derailed" or "derailed" from one or more of these coordination operations. If a "derailed" state is detected, the alarm generating section 30 triggers an action 32. This may involve informing the train driver or automatic emergency braking up to the stationary state of the train.

Figure 2:
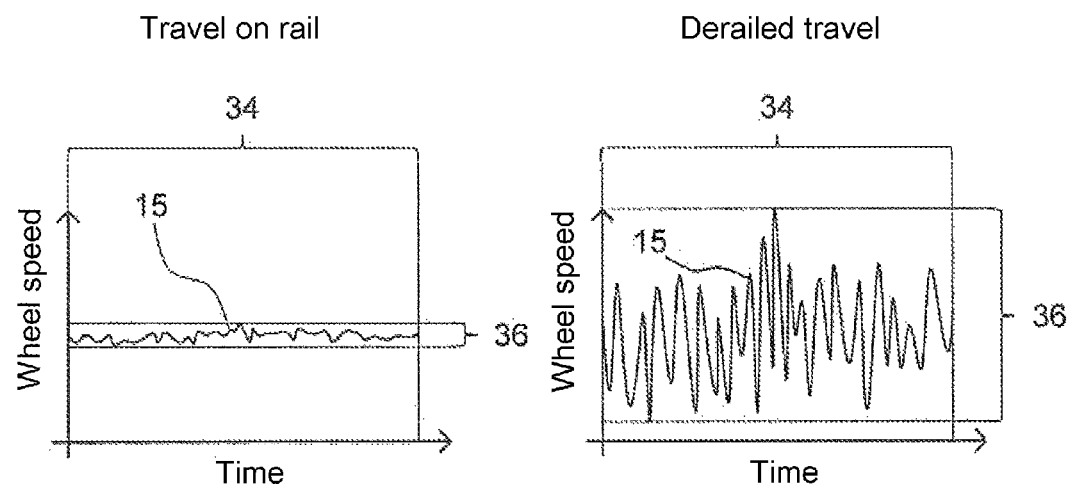
FIG. 2 shows a qualitative time profile of a wheel speed for the states "wheel on the rail" (on the left) and "wheel derailed" (on the right) as well as a schematic evaluation of the travel state on the basis of the range as a measure of the fluctuation intensity.

FIG. 2 shows a qualitative time profile of the rotational speed 15 of the wheel 10. In this context, the diagram on the left shows in qualitative terms a typical rotational speed profile of a wheel which is traveling at a constant velocity on the rail, that is to say is not derailed.

The profile of the wheel speed 15 is subject to certain fluctuations which can be caused by fabrications tolerances, wear or fluctuations in the drive unit of the vehicle. However these fluctuations are significantly smaller in comparison with the diagram on the right.

In the right-hand diagram, a typical time profile of the wheel speed 15 is shown in qualitative terms for a derailed wheel. The wheel speed is subject to significantly more intensive fluctuations, since the wheel impacts repeatedly on the ground, whether a classic superstructure with ties and ballast, or a smooth concrete trackway, and as a result braking or accelerating momentum.

Owing to these two qualitive time profiles of the wheel speed 15 it is possible to discern that it is appropriate to detect a derailed wheel by measuring and evaluating the rotational speed of one or more wheels in order to be able to reliably differentiate between the two states of "not derailed" and "derailed".

A sliding time window 34 is also illustrated in the diagrams, by which time window 34 the travel state is analyzed. The range 36, that is to say the difference between maximum and minimum values of the wheel speed, is illustrated as an example of an evaluation process of the travel state here. In the case of a derailed wheel, the range 36 increases in such a way that derailment can be reliably detected.

LIST OF REFERENCE NUMBERS

10 Wheel
12 Travel direction
14 Rotational direction
15 Wheel speed
16 Shaft
18 Underlying surface
20 Rotational speed-sensing device
22 Rotational speed raw signal
24 Evaluation unit
26 Signal conditioning section
28 Characteristic value determining section
30 Alarm generating section
32 Triggered action
34 Sliding time window
36 Fluctuation intensity of wheel speed (range)

The invention claimed is:

1. A method for determining a critical travel situation of at least one wheel of a rail vehicle, the method comprising:
    comparing, over a sliding time window, a characteristic value of a fluctuation intensity of a rotational speed raw signal of at least one wheel with criteria which describe a critical travel situation to detect the critical travel situation; and
    triggering an action in the rail vehicle in response to detection of the critical travel situation,
    wherein the critical travel state is determined based on comparison of the characteristic value of the at least one wheel with a limiting value, and
    wherein the limiting value is learned and adapted by the method based on the measurement data,
    wherein a width of the sliding time window is variable based on a velocity of the rail vehicle.

2. The method of claim 1, wherein variance of the rotational speed signal of the at least one wheel is used as the characteristic value for the fluctuation intensity of the wheel speeds.

3. The method of claim 1, wherein a standard deviation of the rotational speed signal of the at least one wheel is used as the characteristic value for the fluctuation intensity of the wheel speeds.

4. The method of claim 1, wherein a quadratic mean of the rotational speed signal of the at least one wheel is used as the characteristic value for the fluctuation intensity of the wheel speeds.

5. The method of claim 1, wherein an arithmetic mean of the rotational speed signal of the at least one wheel is used as the characteristic value for the fluctuation intensity of the wheel speeds.

6. The method of claim 1, wherein a range of the rotational speed signal of the at least one wheel is used as the characteristic value for the fluctuation intensity of the wheel speeds.

7. The method of claim 1, wherein frequency components of the rotational speed signal of the at least one wheel are used as the characteristic value for the fluctuation intensity of the wheel speeds.

8. The method of claim 1, wherein a quantile of the rotational speed signal of the at least one wheel is used as characteristic value for the fluctuation intensity of the wheel speeds.

9. The method of claim 1, wherein a median of the rotational speed signal of the at least one wheel is used as the characteristic value for the fluctuation intensity of the wheel speeds.

10. The method of claim 1, wherein a variation coefficient of the rotational speed signal of the at least one wheel is used as the characteristic value for the fluctuation intensity of the wheel speeds.

11. The method of claim 1, wherein a mean absolute interval of the rotational speed signal of the at least one wheel is used as the characteristic value for the fluctuation intensity of the wheel speeds.

12. The method of claim 1, wherein an inter-quantile interval of the rotational speed signal of the at least one wheel is used as the characteristic value for the fluctuation intensity of the wheel speeds.

13. The method of claim 1, wherein the limiting value is configured in a speed-dependent fashion.

14. The method of claim 1, further comprising determining the critical travel state by comparing at least two characteristic values of individual wheels.

15. The method of claim 1, determining the critical travel state by comparing at least one characteristic value of at least one wheel with a mean characteristic value of other wheels.

16. The method of claim 1, further comprising determining the critical travel state by comparing at least one characteristic value of the at least one wheel with chronologically preceding characteristic values of the same wheel.

17. The method of claim 1, wherein the triggered action is an alarm issued to the vehicle driver.

18. The method of claim 1, wherein the triggered action is automatically triggered braking of the rail vehicle.

19. The method of claim 1, wherein the rotational speed raw signal is conditioned for further processing.

20. The method of claim 1, wherein the method is combined with other existing methods for the detection of derailment.

21. A non-transitory computer program product having program code stored on a machine-readable carrier, for carrying out a method when executed on a processor, the method for determining a critical travel situation of at least one wheel of a rail vehicle, the method comprising:
    comparing, over a sliding time window, a characteristic value of a fluctuation intensity of a rotational speed raw signal of at least one wheel with criteria which describe a critical travel situation detect the critical travel situation; and
    triggering an action in the rail vehicle in response to detection of the critical travel situation,
    wherein the critical travel state is determined based on comparison of the characteristic value of the at least one wheel with a limiting value, and
    wherein the limiting value is learned and adapted by the method based on the measurement data,
    wherein a width of the sliding time window is variable based on a velocity of the rail vehicle.

22. A control device for carrying out a method for determining a critical travel situation of at least one wheel of a rail vehicle, the method comprising:
    comparing, over a sliding time window, a characteristic value of a fluctuation intensity of a rotational speed raw signal of at least one wheel with criteria which describe a critical travel situation to detect the critical travel situation; and
    triggering an action in the rail vehicle in response to detection of the critical travel situation,
    wherein the control device is provided in a rail vehicle,
    wherein the critical travel state is determined based on comparison of the characteristic value of the at least one wheel with a limiting value, and
    wherein the limiting value is learned and adapted by the method based on the measurement data,
    wherein a width of the sliding time window is variable based on a velocity of the rail vehicle.

23. The control device of claim 22, wherein the control device has interfaces for triggering an action in the rail vehicle.

* * * * *